US012732980B2

(12) United States Patent
Gou et al.

(10) Patent No.: US 12,732,980 B2
(45) Date of Patent: Sep. 8, 2026

(54) METHODS, DEVICES, AND SYSTEMS FOR TIME-FREQUENCY RESOURCE CONFIGURATION

(71) Applicant: ZTE Corporation, Shenzhen (CN)

(72) Inventors: Wei Gou, Shenzhen (CN); Xianghui Han, Shenzhen (CN); Xingguang Wei, Shenzhen (CN); Kai Xiao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 231 days.

(21) Appl. No.: 18/534,888

(22) Filed: Dec. 11, 2023

(65) Prior Publication Data

US 2024/0147448 A1 May 2, 2024

Related U.S. Application Data

(63) Continuation of application No. PCT/CN2022/081359, filed on Mar. 17, 2022.

(51) Int. Cl.
*H04W 72/0457* (2023.01)
*H04W 72/0446* (2023.01)
(Continued)

(52) U.S. Cl.
CPC ... *H04W 72/0457* (2023.01); *H04W 72/0446* (2013.01); *H04W 72/21* (2023.01); *H04L 5/0007* (2013.01)

(58) Field of Classification Search
CPC ..... H04L 5/0007; H04L 5/001; H04L 5/0091; H04L 5/14; H04L 5/1469; H04L 5/16;
(Continued)

(56) References Cited

U.S. PATENT DOCUMENTS 11,202,315 B2 * 12/2021 Rastegardoost ...... H04W 72/23
2019/0312665 A1 * 10/2019 Jo ...................... H04L 27/2607
(Continued)

FOREIGN PATENT DOCUMENTS

CN 110583077 A 12/2019
CN 112449746 A 3/2021
(Continued)

OTHER PUBLICATIONS

Extended European Search Report regarding EP 22 93 1383 dated Sep. 23, 2024, 9 pages.

(Continued)

*Primary Examiner* — Joseph Arevalo
(74) *Attorney, Agent, or Firm* — Crowell & Moring LLP

(57) ABSTRACT

The present disclosure describes methods, system, and devices for configuring time-frequency resource in a half-duplex and/or full-duplex telecommunication system. The method includes receiving, by a user equipment (UE), first signaling to configure a first slot structure, the first slot structure comprising a symbol attribute of a set of orthogonal frequency division multiplexing (OFDM) symbols as a first symbol attribute; receiving, by the UE, second signaling to configure a second slot structure, the second slot structure comprising to change the symbol attribute of the set of OFDM symbols as a second symbol attribute; and determining, by the UE based on the second slot structure, a bandwidth part (BWP) comprising at least one symbol in the set of OFDM symbols, the BWP having an attribute being same as the second symbol attribute.

17 Claims, 14 Drawing Sheets

(51) Int. Cl.
*H04W 72/21* (2023.01)
*H04L 5/00* (2006.01)

(58) Field of Classification Search
CPC ......... H04W 72/0446; H04W 72/0457; H04W 72/21
USPC ....... 370/329, 252, 350, 280, 328, 331, 336, 370/335, 334
See application file for complete search history.

(56) References Cited

U.S. PATENT DOCUMENTS

| | | | |
|---|---|---|---|
| 2020/0053757 A1 | 2/2020 | Bagheri et al. | |
| 2020/0119895 A1 | 4/2020 | Choi et al. | |
| 2020/0267764 A1 | 8/2020 | Rastegardoost et al. | |
| 2021/0297226 A1* | 9/2021 | Abotabl | H04L 5/0094 |
| 2022/0007395 A1 | 1/2022 | Lei et al. | |
| 2023/0090758 A1* | 3/2023 | Zhang | H04L 5/14 370/277 |
| 2024/0080811 A1* | 3/2024 | Wang | H04L 5/0048 |

FOREIGN PATENT DOCUMENTS

| | | | | |
|---|---|---|---|---|
| CN | 112713976 A | 4/2021 | | |
| EP | 4171145 A1 | 4/2023 | | |
| TW | 202123643 A | 6/2021 | | |
| WO | WO-2021134105 A1 * | 7/2021 | | H04W 72/20 |
| WO | WO-2021231492 A1 * | 11/2021 | | H04L 1/0041 |
| WO | WO-2022014833 A1 * | 1/2022 | | H04L 5/0094 |
| WO | WO-2023048863 A1 * | 3/2023 | | H04B 17/328 |
| WO | WO-2024063863 A1 * | 3/2024 | | H04L 5/0094 |

OTHER PUBLICATIONS

International Search Report and Written Opinion regarding PCT/CN2022/081359 dated Jul. 29, 2022, 7 pages.

Chinese-language Office Action with machine translation issued in Chinese Application No. 202280093436.2 dated Sep. 13, 2025, (16 pages).

Chinese Office Action with English machine translation issued in Application No. 202280093436.2 dated Jun. 5, 2026, (18 pages).

Indian Office Action issued in Application No. 202417032115 dated Jul. 16, 2026, (8 pages).

* cited by examiner

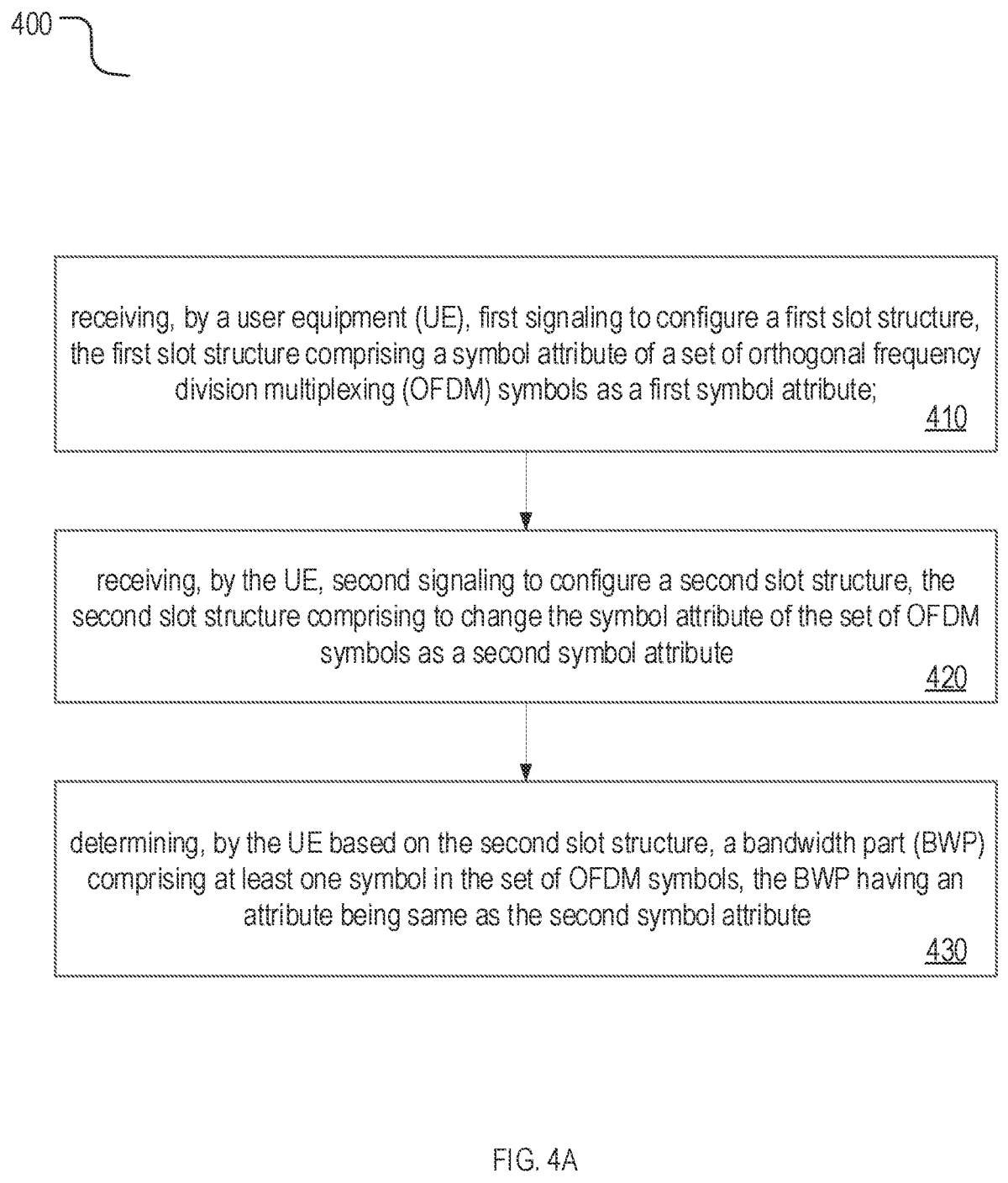

400 receiving, by a user equipment (UE), first signaling to configure a first slot structure, the first slot structure comprising a symbol attribute of a set of orthogonal frequency division multiplexing (OFDM) symbols as a first symbol attribute;
410 receiving, by the UE, second signaling to configure a second slot structure, the second slot structure comprising to change the symbol attribute of the set of OFDM symbols as a second symbol attribute
420 determining, by the UE based on the second slot structure, a bandwidth part (BWP) comprising at least one symbol in the set of OFDM symbols, the BWP having an attribute being same as the second symbol attribute
430

FIG. 4A

450 sending, by a base station, first signaling to configure a first slot structure for a user equipment (UE), the first slot structure comprising a symbol attribute of a set of orthogonal frequency division multiplexing (OFDM) symbols as a first symbol attribute; 460 sending, by the base station, second signaling to configure a second slot structure for the UE, the second slot structure comprising to change the symbol attribute of the set of OFDM symbols as a second symbol attribute 470 configuring, by the base station based on the second slot structure, a bandwidth part (BWP) comprising at least one symbol in the set of OFDM symbols, the BWP having an attribute being same as the second symbol attribute 480

FIG. 4B

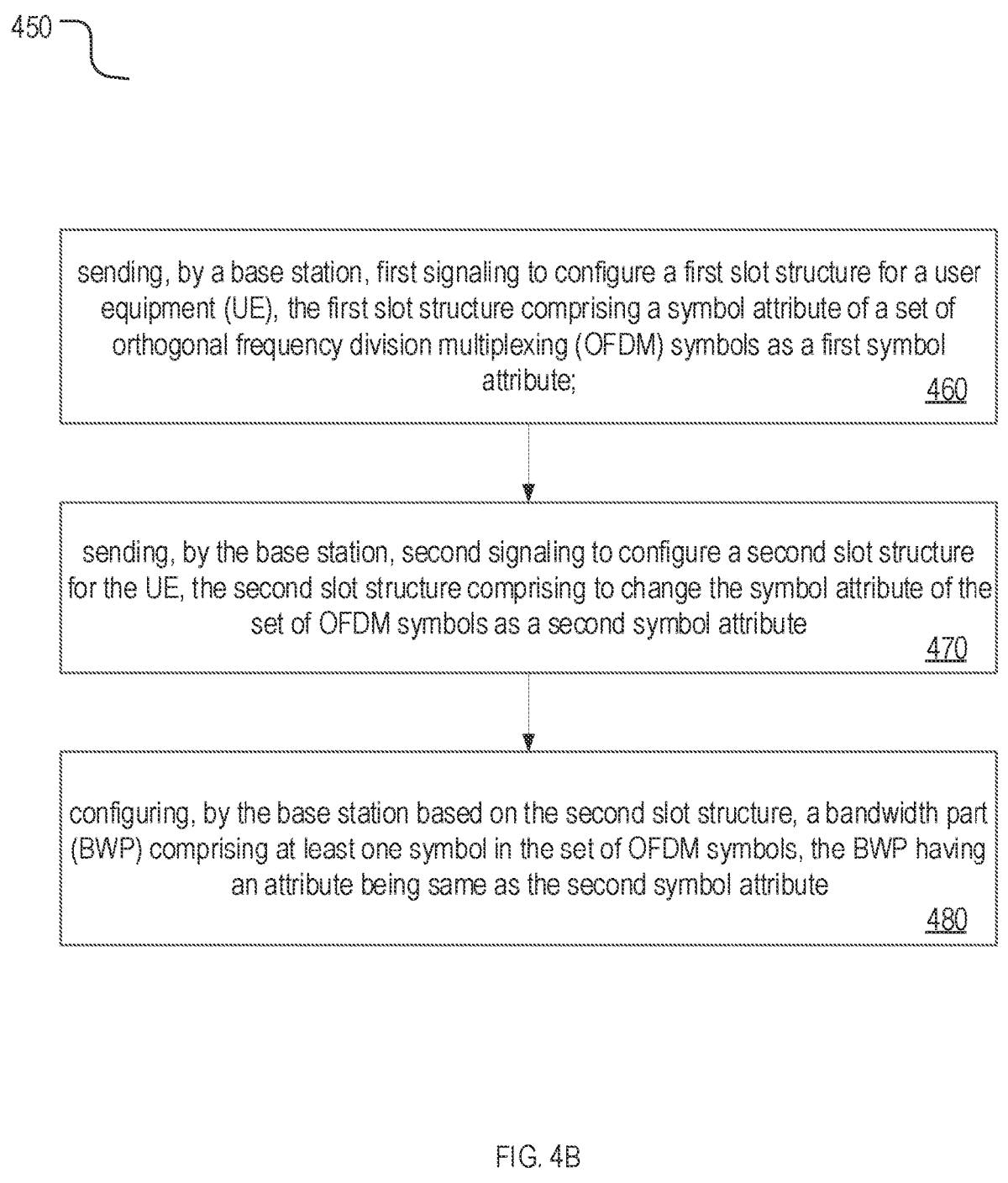

METHODS, DEVICES, AND SYSTEMS FOR TIME-FREQUENCY RESOURCE CONFIGURATION

CROSS-REFERENCE TO RELATED APPLICATION

This application is a continuation application of PCT International Patent Application No. PCT/CN2022/081359, filed with the China National Intellectual Property Administration, PRC on Mar. 17, 2022, which is herein incorporated by reference in its entirety.

TECHNICAL FIELD

The present disclosure is directed generally to wireless communications. Particularly, the present disclosure relates to methods, devices, and systems for configuring time-frequency resource.

BACKGROUND

Wireless communication technologies are moving the world toward an increasingly connected and networked society. High-speed and low-latency wireless communications rely on efficient network resource management and allocation between user equipment and wireless access network nodes (including but not limited to base stations). A new generation network is expected to provide high speed, low latency and ultra-reliable communication capabilities and fulfill the requirements from different industries and users.

With the rapid evolution of cellular mobile communication systems, a half-duplex and/or a full-duplex technology may be an important feature to further improve efficiency and performance of the new generation mobile communication technology. The half-duplex or full-duplex technology may enable half-duplex or full duplex with time-frequency resources. There are problems/issues associated with implementing the half-duplex and/or full-duplex technology. One of the problems/issues may include the time-frequency resource configuration under the half-duplex and/or full-duplex technology.

The present disclosure describes various embodiments for configuring time-frequency resource, which may address at least one of issues/problems associated with the existing system, particularly solving the issues/problems related to configure time-frequency resource, thus improving the efficiency and/or performance of the wireless communication.

SUMMARY

This document relates to methods, systems, and devices for wireless communication, and more specifically, for configuring time-frequency resource in a half-duplex and/or full-duplex telecommunication system. The various embodiments in the present disclosure may include a new time-frequency resource and frame structure configuration method, which is beneficial to improve the interference between uplink and downlink configuration and/or transmission, to increase the resource utilization efficiency, and to boost latency performance of the wireless communication, including but not limited to, ultra-reliable low latency communication (URLLC).

In one embodiment, the present disclosure describes a method for wireless communication. The method includes receiving, by a user equipment (UE), first signaling to configure a first slot structure, the first slot structure comprising a symbol attribute of a set of orthogonal frequency division multiplexing (OFDM) symbols as a first symbol attribute; receiving, by the UE, second signaling to configure a second slot structure, the second slot structure comprising to change the symbol attribute of the set of OFDM symbols as a second symbol attribute; and determining, by the UE based on the second slot structure, a bandwidth part (BWP) comprising at least one symbol in the set of OFDM symbols, the BWP having an attribute being same as the second symbol attribute.

In one embodiment, the present disclosure describes a method for wireless communication. The method includes sending, by a base station, first signaling to configure a first slot structure for a user equipment (UE), the first slot structure comprising a symbol attribute of a set of orthogonal frequency division multiplexing (OFDM) symbols as a first symbol attribute; sending, by the base station, second signaling to configure a second slot structure for the UE, the second slot structure comprising to change the symbol attribute of the set of OFDM symbols as a second symbol attribute; and configuring, by the base station based on the second slot structure, a bandwidth part (BWP) comprising at least one symbol in the set of OFDM symbols, the BWP having an attribute being same as the second symbol attribute.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4A shows a flow diagram of a method for wireless communication.

FIG. 4B shows a flow diagram of another method for wireless communication.

DETAILED DESCRIPTION

Figure 1:
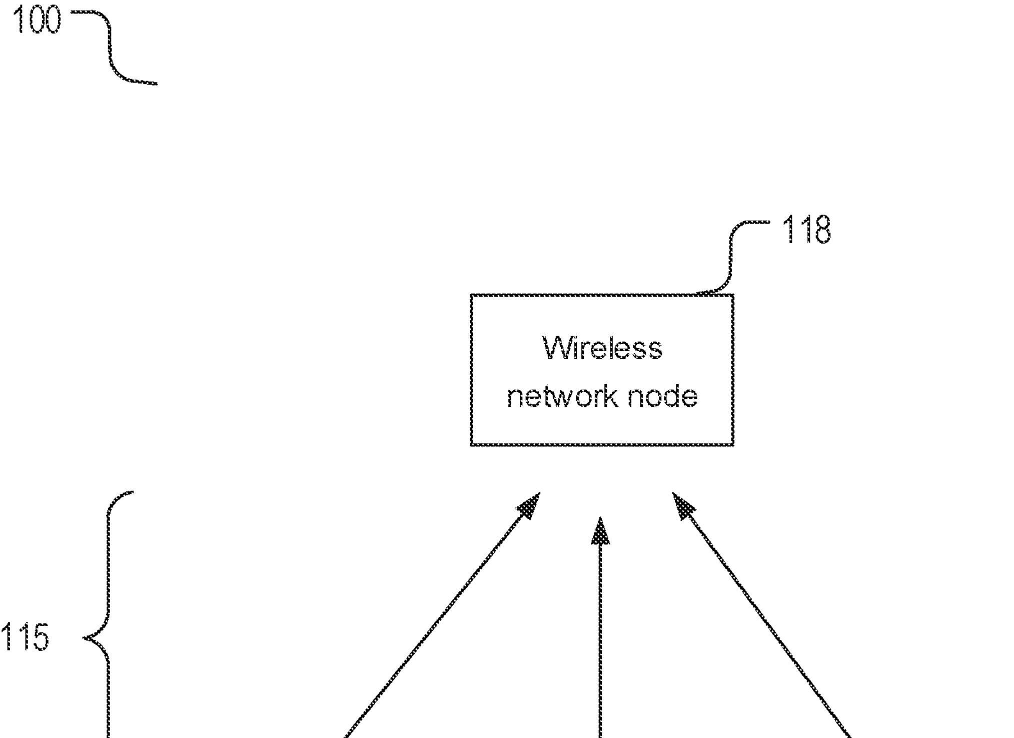
FIG. 1 shows an example of a wireless communication system include one wireless network node and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for configuring time-frequency resource in a half-duplex and/or full-duplex telecommunication system.

New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users.

With the rapid evolution of cellular mobile communication systems, a half-duplex and/or a full-duplex technology may be an important feature to further improve efficiency and performance of the new generation mobile communication technology. The half-duplex or full-duplex technology may enable half-duplex or full duplex with time-frequency resources. There are problems/issues associated with implementing the half-duplex and/or full-duplex technology. One of the problems/issues may include the time-frequency resource configuration under the half-duplex and/or full-duplex technology.

In some implementations, the full duplex technology may enable full duplex with different frequency resources at a same time in the time domain (i.e., same slot). In some other implementations, half duplex mode, i.e. only transmitting or receiving at a certain time, may be utilized in order to avoid increasing implementation complexity. For example, in a time division duplex (TDD) system, TDD spectrum resources may be divided into downlink (DL) and uplink (UL) in the time domain in order to transmit uplink data and downlink data. Thus, for a traditional TDD system, only uplink or downlink may be performed in each period. In order to further improve the efficiency of TDD systems, it may support full duplex for a TDD system, so that the TDD system is able to support both uplink and downlink in each period in the time domain.

In some implementations, the full-duplex technology may lead to increased complexity and/or increased cost, especially for a user equipment (UE) due to the expanded capability of supporting both uplink and downlink in each period in the time domain.

In some implementations, a compromise solution may be implemented to avoid increased complexity and/or increased cost to a certain extent. For example but not limited to, in a TDD system, the base station side may support full duplex, that is, the base station supports both uplink and downlink in time periods in the time domain; and the UE side may support half duplex but may not support full duplex, that is, the UE may not support uplink and downlink simultaneous in the time domain, but the UE may support uplink and downlink at different times in the time domain. With half-duplex technology, these implementations may maintain a low UE cost and/or low complexity; and/or this compromise solution may also improve the efficiency of the TDD system.

In order to support this full-duplex or half-duplex technology, this patent application proposes a new time-frequency resource and slot/frame structure configuration method, which is beneficial to improve the interference between the uplink and the downlink, and also improve the efficiency of resources as much as possible.

FIG. 1 shows a wireless communication system 100 including a wireless network node 118 and one or more user equipment (UE) 110. The wireless network node may include a network base station, which may be a nodeB (NB, e.g., a gNB) in a mobile telecommunications context. Each of the UE may wirelessly communicate with the wireless network node via one or more radio channels 115 for downlink/uplink communication. For example, a first UE 110 may wirelessly communicate with a wireless network node 118 via a channel including a plurality of radio channels during a certain period of time. The network base station 118 may send high layer signaling to the UE 110. The high layer signaling may include configuration information for communication between the UE and the base station. In one implementation, the high layer signaling may include a radio resource control (RRC) message.

Figure 2:
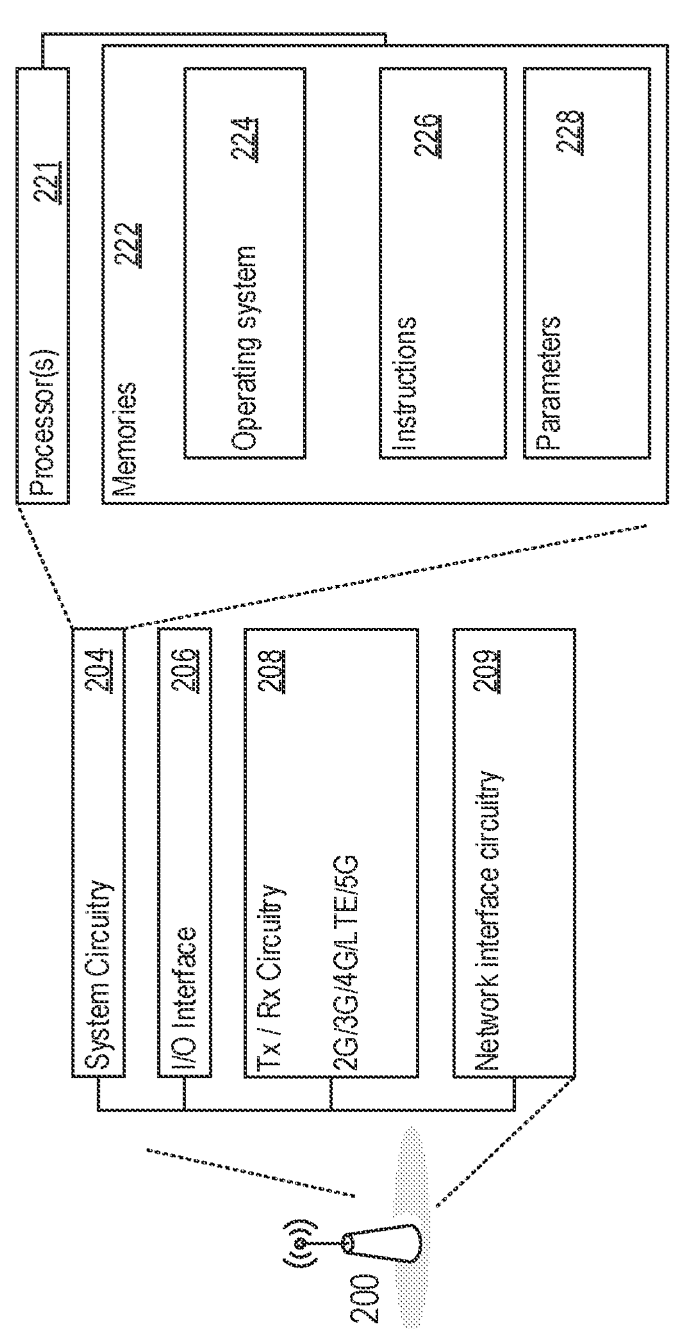
FIG. 2 shows an example of a network node.

FIG. 2 shows an example of electronic device 200 to implement a network base station. The example electronic device 200 may include radio transmitting/receiving (Tx/Rx) circuitry 208 to transmit/receive communication with UEs and/or other base stations. The electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the network node. The parameters 228 may include parameters to support execution of the instructions 226. For example, parameters may include network protocol settings, bandwidth parameters, radio frequency mapping assignments, and/or other parameters.

Figure 3:
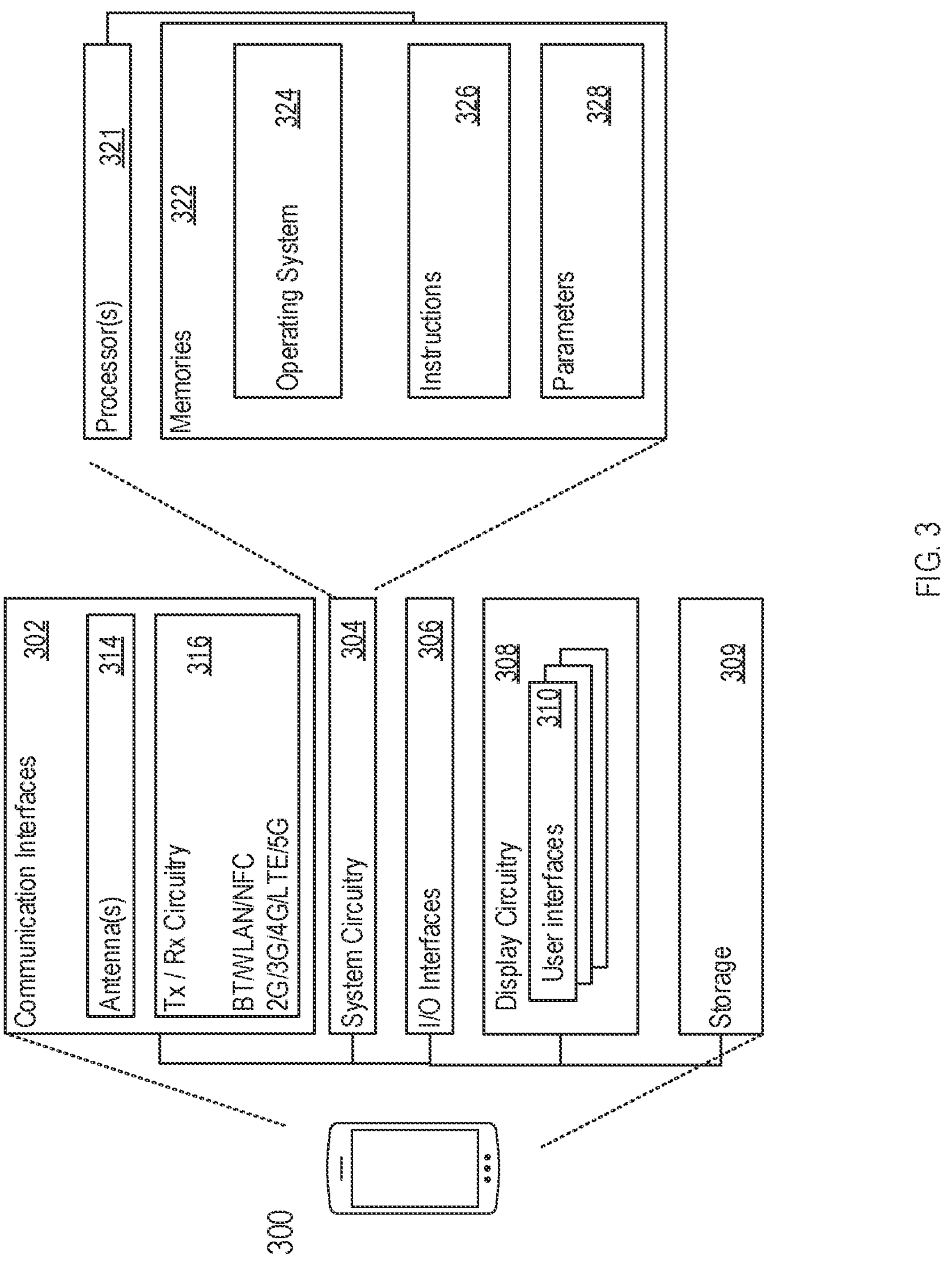
FIG. 3 shows an example of a user equipment.

FIG. 3 shows an example of an electronic device to implement a terminal device 300 (for example, user equipment (UE)). The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), 5G standards, and/or 6G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G, 6G, or other data that the UE 300 will send, or has received, through the communication interfaces 302. In various implementations, a system power for the UE 300 may be supplied by a power storage device, such as a battery or a transformer.

The present disclosure describes various embodiment for configuring time-frequency resource in a half-duplex and/or full-duplex telecommunication system, which may be implemented, partly or totally, on the network base station and/or the user equipment described above in FIGS. 2-3. The various embodiments in the present disclosure may enable efficient time-frequency resource configuration in a half-duplex and/or full-duplex telecommunication system, which may reduce gNB's and/or UE's implementation complexity, increase the resource utilization efficiency, and/or boost latency performance of URLLC traffic.

Referring to FIG. 4A, the present disclosure describes various embodiments of a method 400 for wireless communication. The method may include a portion or all of the following steps: step 410, receiving, by a user equipment (UE), first signaling to configure a first slot structure, the first slot structure comprising a symbol attribute of a set of orthogonal frequency division multiplexing (OFDM) symbols as a first symbol attribute; step 420, receiving, by the UE, second signaling to configure a second slot structure, the second slot structure comprising to change the symbol attribute of the set of OFDM symbols as a second symbol attribute; and/or step 430, determining, by the UE based on the second slot structure, a bandwidth part (BWP) comprising at least one symbol in the set of OFDM symbols, the BWP having an attribute being same as the second symbol attribute.

In various embodiments in the present disclosure, the term "change" a symbol attribute of a symbol in this context may mean to configure a new symbol attribute to the symbol in comparison to an old symbol attribute of the symbol, or to subvert the old symbol attribute of the symbol by the new symbol attribute, or to replace the old symbol attribute of the symbol by the new symbol attribute, wherein the new symbol attribute is different from the old symbol attribute.

Referring to FIG. 4B, the present disclosure describes various embodiments of a method 450 for wireless communication. The method may include a portion or all of the following steps: step 460, sending, by a base station, first signaling to configure a first slot structure for a user equipment (UE), the first slot structure comprising a symbol attribute of a set of orthogonal frequency division multiplexing (OFDM) symbols as a first symbol attribute; step 470, sending, by the base station, second signaling to configure a second slot structure for the UE, the second slot structure comprising to change the symbol attribute of the set of OFDM symbols as a second symbol attribute; and/or step 480, configuring, by the base station based on the second slot structure, a bandwidth part (BWP) comprising at least one symbol in the set of OFDM symbols, the BWP having an attribute being same as the second symbol attribute.

In some implementations, the first signaling comprises common signaling for at least one UE in a cell; and/or the second signaling comprises UE-specific signaling for the UE.

In some implementations, the first symbol attribute comprises one of uplink, downlink, or flexible; the second symbol attribute comprises one of uplink or downlink; and/or the first symbol attribute and the second symbol attribute are different.

In some implementations, the first symbol attribute is flexible; the second symbol attribute is downlink; and/or the BWP comprises a downlink BWP configured for the UE.

In some implementations, in response to a second set of symbols in the set of OFDM symbols being configured to transmit a common uplink channel; the downlink BWP comprises the set of OFDM symbols except the second set of symbols.

In some implementations, in response to a second set of symbols in the set of OFDM symbols being configured to transmit a common uplink channel; the downlink BWP comprises the second set of symbols and is configured to be non-overlapping with the common uplink channel in a frequency domain.

In some implementations, the common uplink channel comprises at least one of the following: a physical random access channel (PRACH), common physical uplink control channel (PUCCH) resource of a cell, an uplink (UL) initial BWP, a reference signal, a demodulation reference signal (DMRS), or a sounding reference signal (SRS).

In some implementations, in response to a second set of symbols in the set of OFDM symbols being configured as a part of an uplink initial BWP and the uplink initial BWP overlapping with the downlink BWP in a frequency domain; the downlink BWP comprises the set of OFDM symbols except the second set of symbols, and/or the second set of symbols is treated as uplink symbols.

In some implementations, the first symbol attribute is flexible; the second symbol attribute is uplink; and/or the BWP comprises an uplink BWP configured for the UE.

In some implementations, in response to a second set of symbols in the set of OFDM symbols being configured to transmit a common downlink channel; the uplink BWP comprises the set of OFDM symbols except the second set of symbols.

In some implementations, in response to a second set of symbols in the set of OFDM symbols being configured to transmit a common downlink channel; the uplink BWP comprises the second set of symbols and is configured to be non-overlapping with the common uplink channel in a frequency domain.

In some implementations, the common downlink signaling comprises at least one of the following: a synchronization signal block (SSB), a control resource set (CORESET) #0, a downlink initial BWP, a CORESET for a common channel, a system information block (SIB), a reference signal, a demodulation reference signal (DMRS), a channel state information reference signal (CSI-RS), a positioning reference signal, or a synchronization tracking reference signal.

In some implementations, in response to a second set of symbols in the set of OFDM symbols being configured as a part of a downlink initial BWP and the downlink initial BWP overlapping with the uplink BWP in a frequency domain; the uplink BWP comprises the set of OFDM symbols except the second set of symbols, and/or the second set of symbols is treated as downlink symbols.

Figure 5A:
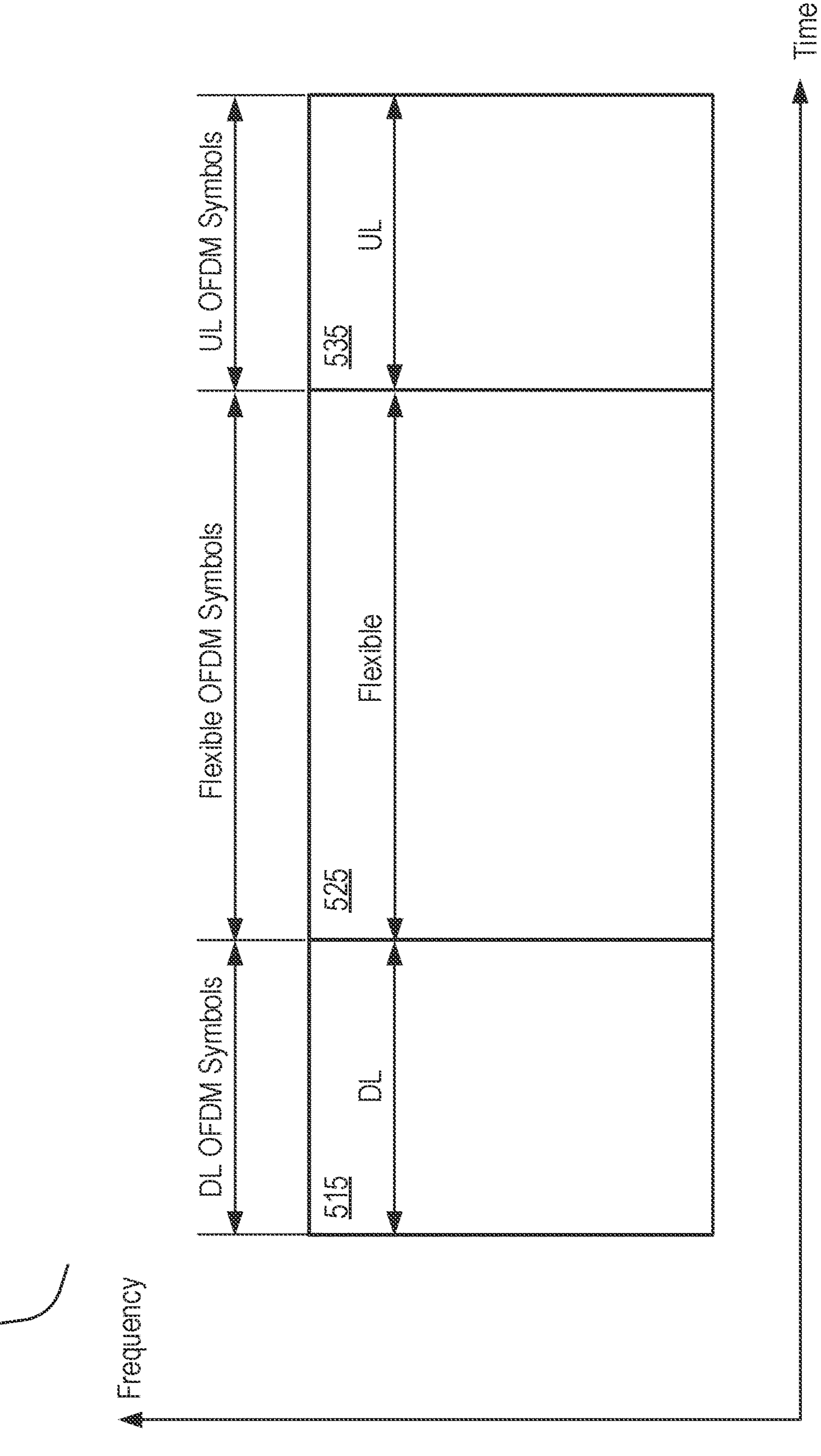
FIG. 5A shows a schematic diagram of an exemplary embodiment for wireless communication.
Figure 5B:
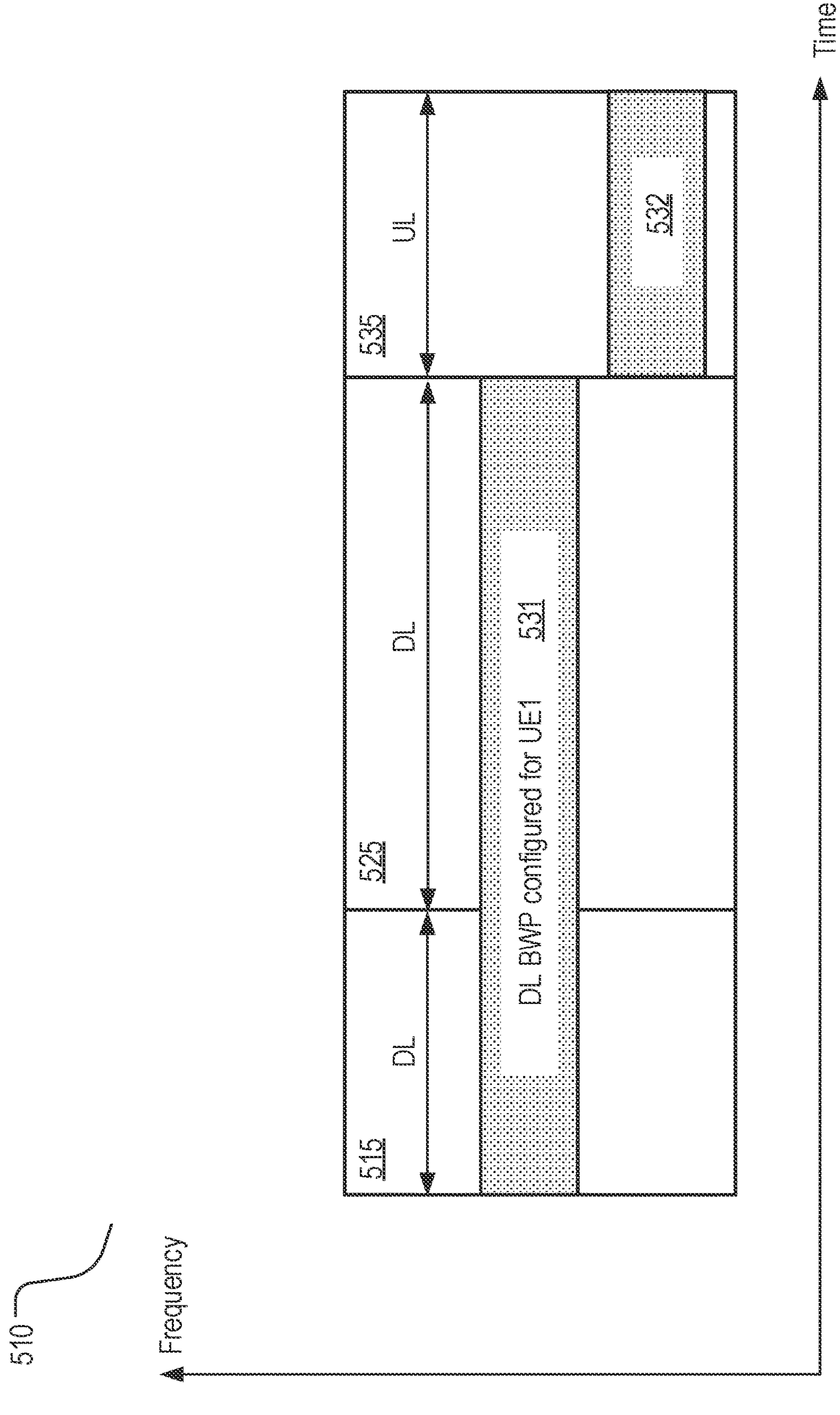
FIG. 5B shows a schematic diagram of another exemplary embodiment for wireless communication.
Figure 5C:
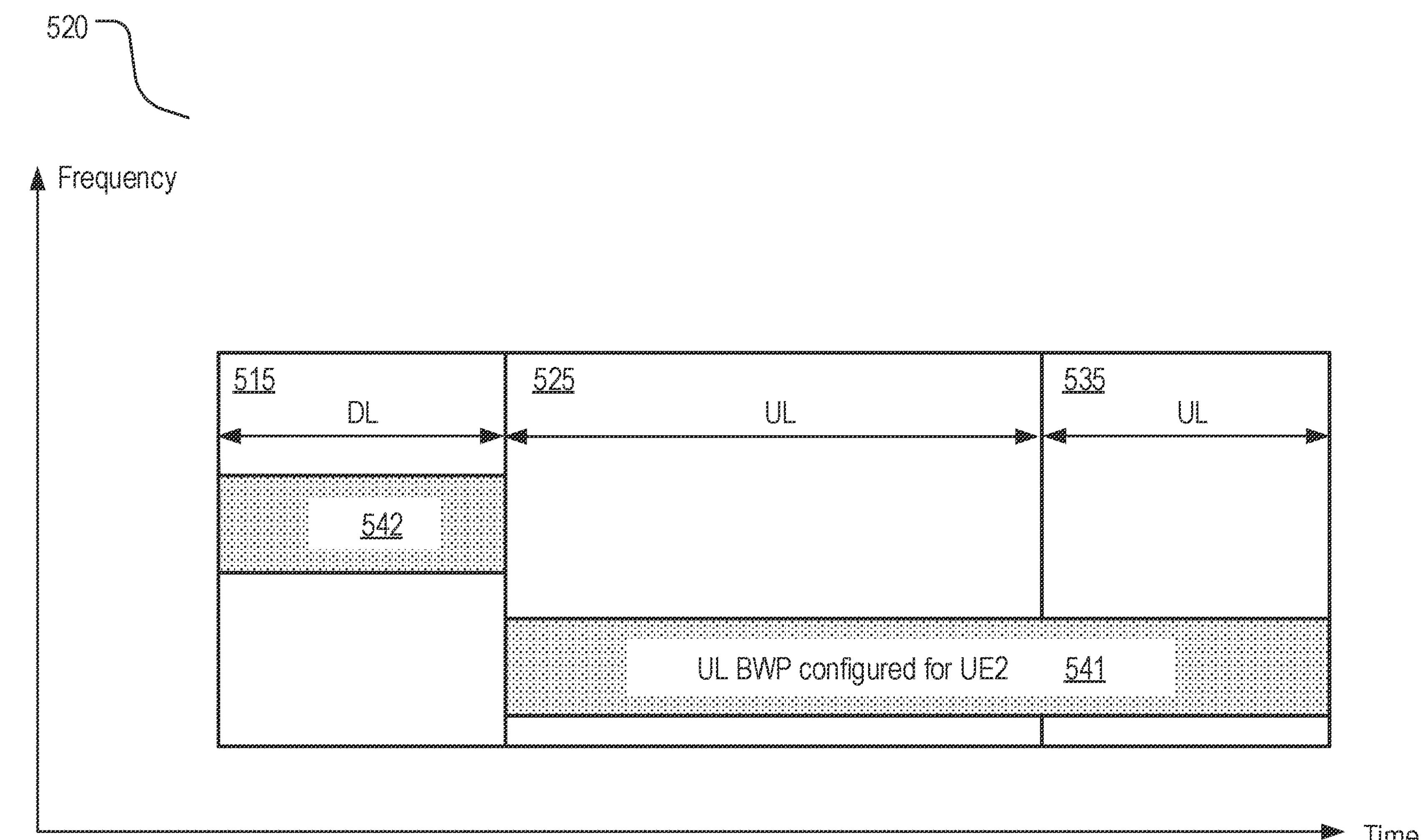
FIG. 5C shows a schematic diagram of another exemplary embodiment for wireless communication.

In various embodiments, as show in FIGS. 5A, 5B, and 5C, a slot structure of a wireless communication system (e.g., TDD system) may include one or more OFDM symbols. The slot structure may include three sets of OFDM symbols, one set of OFDM symbols 515, another set of OFDM symbols 525, and another set of OFDM symbols 535. In some implementations, each OFDM symbol may be configured with uplink, downlink or flexible symbol properties. For example but not limited to, a slot contains 14 OFDM symbols, and each OFDM symbol is configured with one of the following three attributes: uplink, downlink, and/or flexible symbols. Flexible symbols may be dynamically modified into uplink symbols or downlink symbols by signaling. Some signals, such as SSB, may be allowed to be transmitted in the flexible symbol.

In various embodiments, full-duplex technology (for example, including full-duplex on the base station side and half-duplex on the UE side) may be supported. The slot structure with a resource configuration or frame structure configuration may support both old UEs (e.g., legacy UEs supporting old configurations only) and new UEs (e.g., the new UEs supporting new configuration and old configuration).

In some implementations, there may be both legacy UEs and new UEs in a cell or carrier, and three groups (or types) of UEs in the same cell may be configured with different slot structures.

Referring to FIG. 5A, a slot structure 500 may be configured for all UEs (legacy and new UEs) in the cell. Referring to FIG. 5B, a slot structure 510 may be configured for a new UE (or a first new UE (UE1)) in the cell. Referring to FIG. 5C, a slot structure 520 may be configured for another new UE (or a second new UE (UE2)) in the cell.

In some implementations, the base station configures a slot structure for all UEs (legacy and new UEs) through common signaling, so that all UEs get a slot structure from the common signaling. For example, as shown in FIG. 5A, one set of OFDM symbols 515 is configured as DL OFDM symbols with attributes of downlink, another set of OFDM symbols 525 is configured as flexible OFDM symbols with attributes of flexible, and another set of OFDM symbols 535 is configured as UL OFDM symbols with attributes of uplink.

In some implementations, a new signaling, for example but not limited to, RRC signaling, MAC CE signaling, or DCI signaling, may be introduced and/or may be used to configure the slot structure for one or more new UEs in the cell or carrier. The new UE may perform UE-level data transmission and reception according to the slot structure configured by the new signaling, except for some special signal/channel transmission and reception (such as synchronization signals).

As shown in FIG. 5A, a slot structure 500 is configured as the new UE1 through the cell common signaling, and as shown in FIG. 5B, the base station may further configure a slot structure 510 for the new UE1 by using the new signaling. The new UE1 may consider that the uplink or downlink common signal/channel transmission of the cell are determined based on the slot structure of the common signaling configuration. The new UE1 may consider that the data transmission and reception (for example, at least UE-specific data) are determined based on the slot structure of the new signaling configuration.

As shown in FIG. 5B, when the new signaling configures the slot structure, the downlink symbols of the slots configured by the common signaling remain unchanged. The uplink symbols of the slot configured by the common signaling remain unchanged. The flexible symbols of the slot configured by the common signaling are subverted/changed by the slot structure configured by the new signaling. In this way, the flexible symbols of the slot configured by the common signaling may be configured to transmit common downlink signals/channels, such as SSB, CORESET #0, etc. Therefore, the new UE1 may be able to receive SSB, CORESET #0 (including various downlink common signals/channels) from the flexible symbols in the slot of the common signaling configuration.

Optionally in some implementations, the new UE1 may be configured with a DL BWP 531 based on the DL symbols in the slot structure configured by the new signaling. The data transmission of the new UE1 may be transmitted based on the DL BWP.

Optionally in some implementations, the new UE1 may be configured with a UL BWP 532 based on the UL symbols in the slot structure configured by the new signaling. The data transmission of the new UE1 may be transmitted based on the UL BWP.

Optionally in some implementations, the new UE1 may receive common downlink signals/channels in the DL symbols configured in common signaling. That is to say, common downlink signals/channels can only be received in DL symbols configured according to common signaling.

In some implementations, the new UE2 may be in the same cell or carrier as the new UE1. The slot structure of the common signaling configuration in FIG. 5A may also valid for the new UE2. The base station also uses the new signaling to configure a slot structure 530 for the new UE2, as shown in FIG. 5C. The flexible symbols of the slot structure configured by the common signaling are configured as UL symbols by this new signaling. In this way, the two slot structures (e.g., 500 and 530) are configured for the new UE2, the transmission and reception of the new UE2 may be based on the slot structure configured by the new signaling, except for the reception of cell common signals/channels (such as SSB, CORESET #0, etc.).

In some implementations, the base station may configure the SSB or CORESET #0 to be transmitted in the flexible symbol for all UEs in the cell or carrier based on the slot structure configured by the common signaling. The flexible symbol for the new UE2 is the UL symbol in the slot structure configured by the new signaling. The new UE2 may also receive the cell-common signal/channel from the UL symbol.

Optionally in some implementations, the new UE2 may receive the SSB from the UL symbol, for another example CORESET #0. Specifically, the base station and the UE may agree that the SSB and CORESET #0 are allowed to be transmitted in the UL symbol, and the new UE2 is allowed to receive the SSB and CORESET #0. Alternatively, the base station and the UE may agree that the SSB is allowed to be transmitted in the UL symbol (but the CORESET #0 is not allowed to be transmitted), and the new UE2 is allowed to receive the SSB.

Optionally in some implementations, for the new UE2, the following operations may also be considered. The new UE2 may only receive the common downlink signals/channels from the DL symbols configured by the common signaling. In this way, in combination with the above method, it may be avoided that the new UE2 receives the common downlink signal/channel from the UL symbols.

Optionally in some implementations, for the new UE2, based on the UL symbols in the slot structure configured by the new signaling, a UL BWP 541 may be configured for uplink data transmission, such as dynamically scheduled data, semi-statically transmitted data, and common uplink signals (or channel) may be transmitted in the UL BWP. In this case, the frequency domain resources of the UL BWP may be configured to avoid overlapping (including partial overlap) with the resources of the common signal/channel of the cell. Optionally in some implementations, the frequency domain resources of the UL BWP configuration may not include the resources of the common signal/channel of the cell. (e.g., frequency division between UL BWP and cell common signals/channels).

Optionally in some implementations, the new UE2 may be configured with a DL BWP 542 based on the DL symbols in the slot structure configured by the new signaling. The data transmission of the new UE2 may be transmitted based on the DL BWP.

As describes in the above embodiments/implementations, the three groups/types of UEs may belong to the same cell or carrier, and the obtained slot structures may be different for each group/type of UE; and/or the behaviors of different UEs may be based on the configured slot structures.

In various embodiments, for the method 400 or 450, the first symbol attribute is downlink; the second symbol attribute is uplink; and/or the BWP comprises an uplink BWP configured for the UE.

In some implementations, in response to a second set of symbols in the set of OFDM symbols being configured to transmit a common downlink channel; the uplink BWP comprises the set of OFDM symbols except the second set of symbols.

In some implementations, in response to a second set of symbols in the set of OFDM symbols being configured to transmit a common downlink channel; the uplink BWP comprises the second set of symbols and is configured to be non-overlapping with the common uplink channel in a frequency domain.

In some implementations, the common downlink signaling comprises at least one of the following: a synchronization signal block (SSB), a control resource set (CORESET) #0, a downlink initial BWP, a CORESET for a common channel, a system information block (SIB), a reference signal, a demodulation reference signal (DMRS), a channel state information reference signal (CSI-RS), a positioning reference signal, and/or a synchronization tracking reference signal.

In some implementations, in response to a second set of symbols in the set of OFDM symbols being configured as a part of a downlink initial BWP and the downlink initial BWP overlapping with the uplink BWP in a frequency domain; the uplink BWP comprises the set of OFDM symbols except the second set of symbols, and/or the second set of symbols is treated as downlink symbols.

Figure 6A:
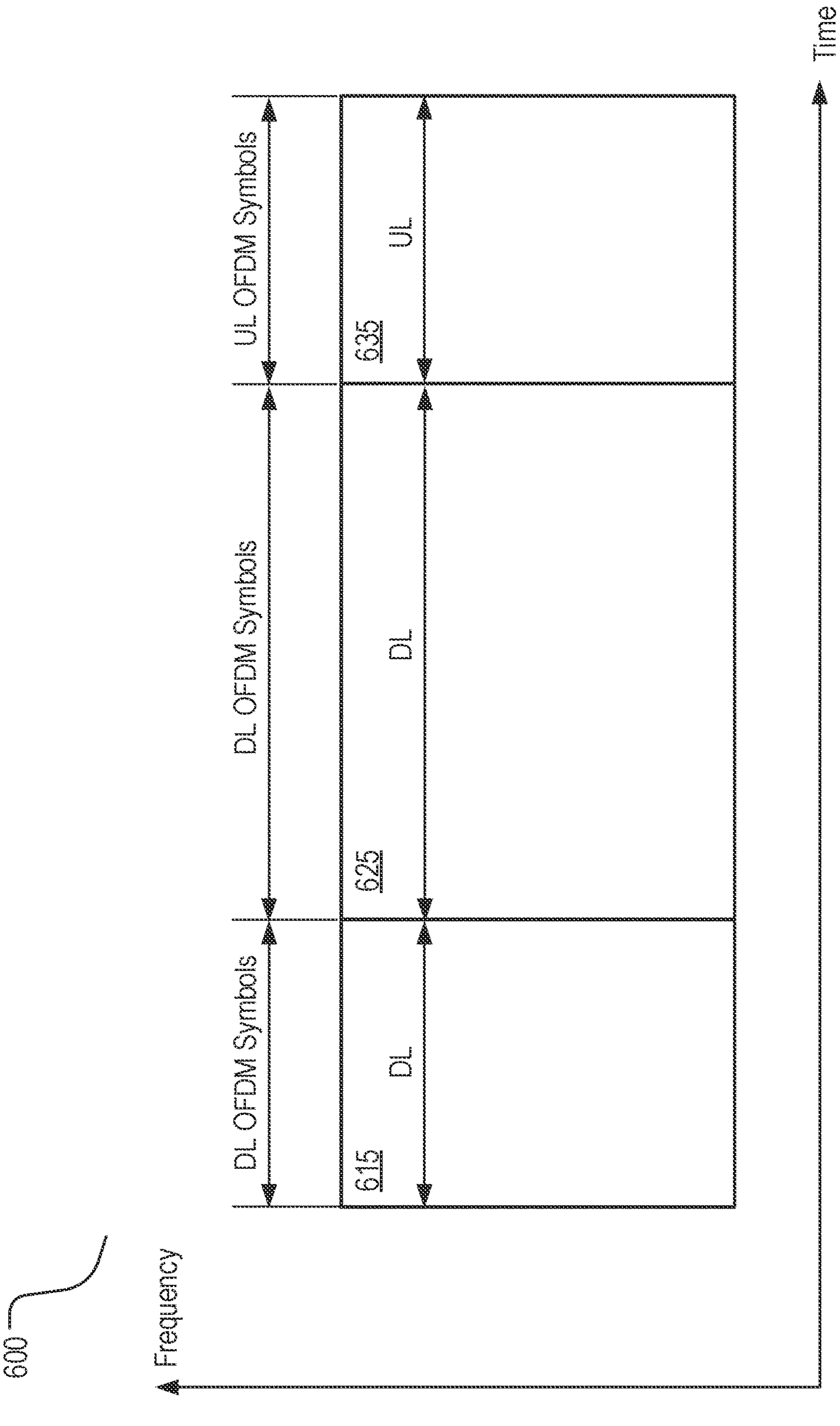
FIG. 6A shows a schematic diagram of an exemplary embodiment for wireless communication.

In various embodiments, referring to FIG. 6A, a middle of a slot 625 may be DL OFDM symbols rather than flexible symbols, a left portion of the slot 615 may be DL OFDM symbols, and a right portion of the slot 635 may be UL OFDM symbols.

In some implementations, there may be both old UEs and new UEs in a cell or carrier. The base station configures the slot structure for all UEs through signaling (e.g., common signaling). This is a common signaling, so that all UEs get the same slot structure. In some implementations, a slot configuration 600 is shown in FIG. 6A, such as configuring the symbol attributes (such as DL and/or UL) within the slot.

Figure 6B:
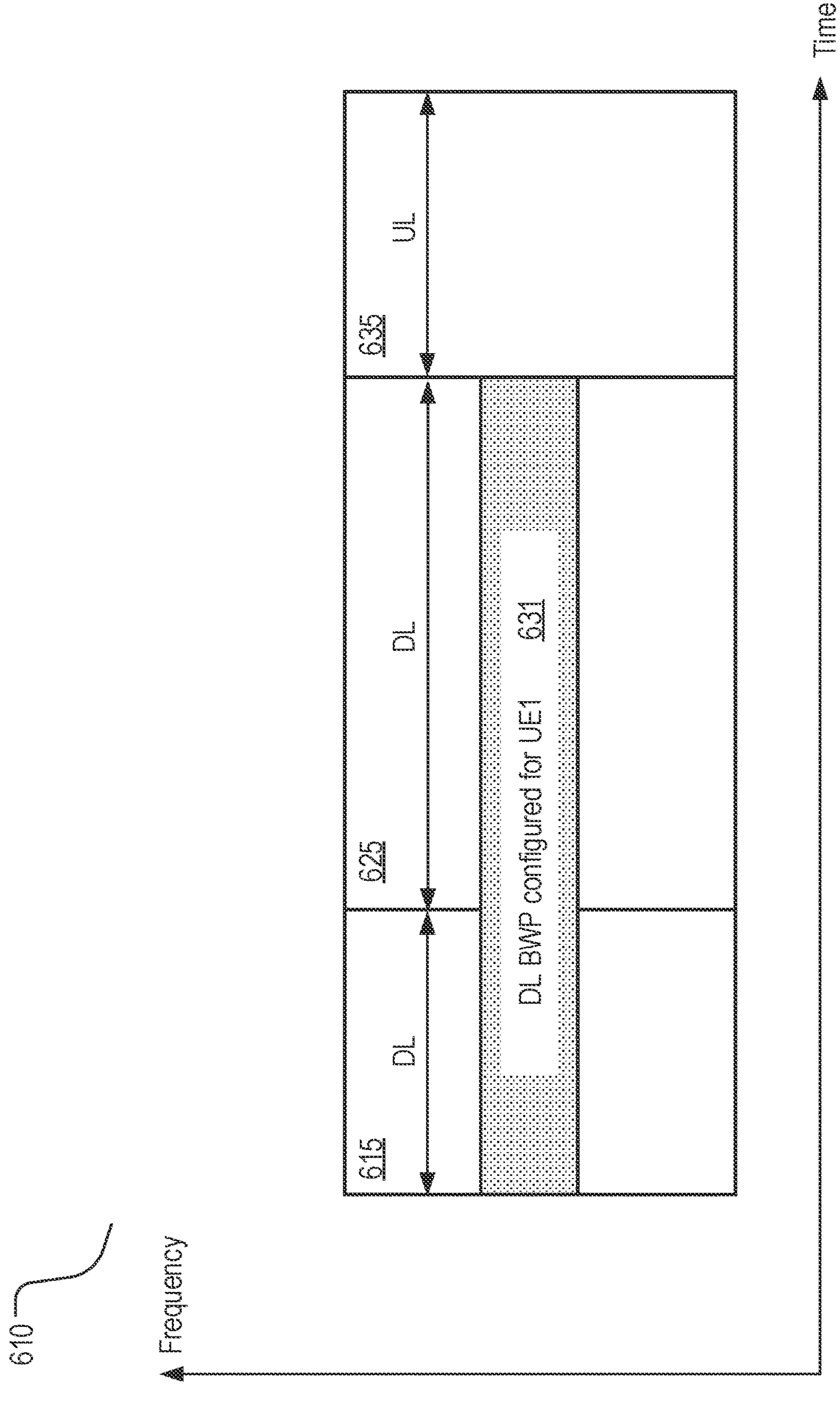
FIG. 6B shows a schematic diagram of another exemplary embodiment for wireless communication.

In some implementations, referring to FIG. 6B, the configured slot structure 610 is the same as the slot structure 600 in FIG. 6A for a new UE (e.g., a first new UE, UE1), and the new UE1 does not need to consider a new processing method. Optionally in some implementations, the new UE1 may be configured with a DL BWP 631 based on the DL symbols in the slot structure. The data transmission of the new UE1 may be transmitted based on the DL BWP.

Figure 6C:
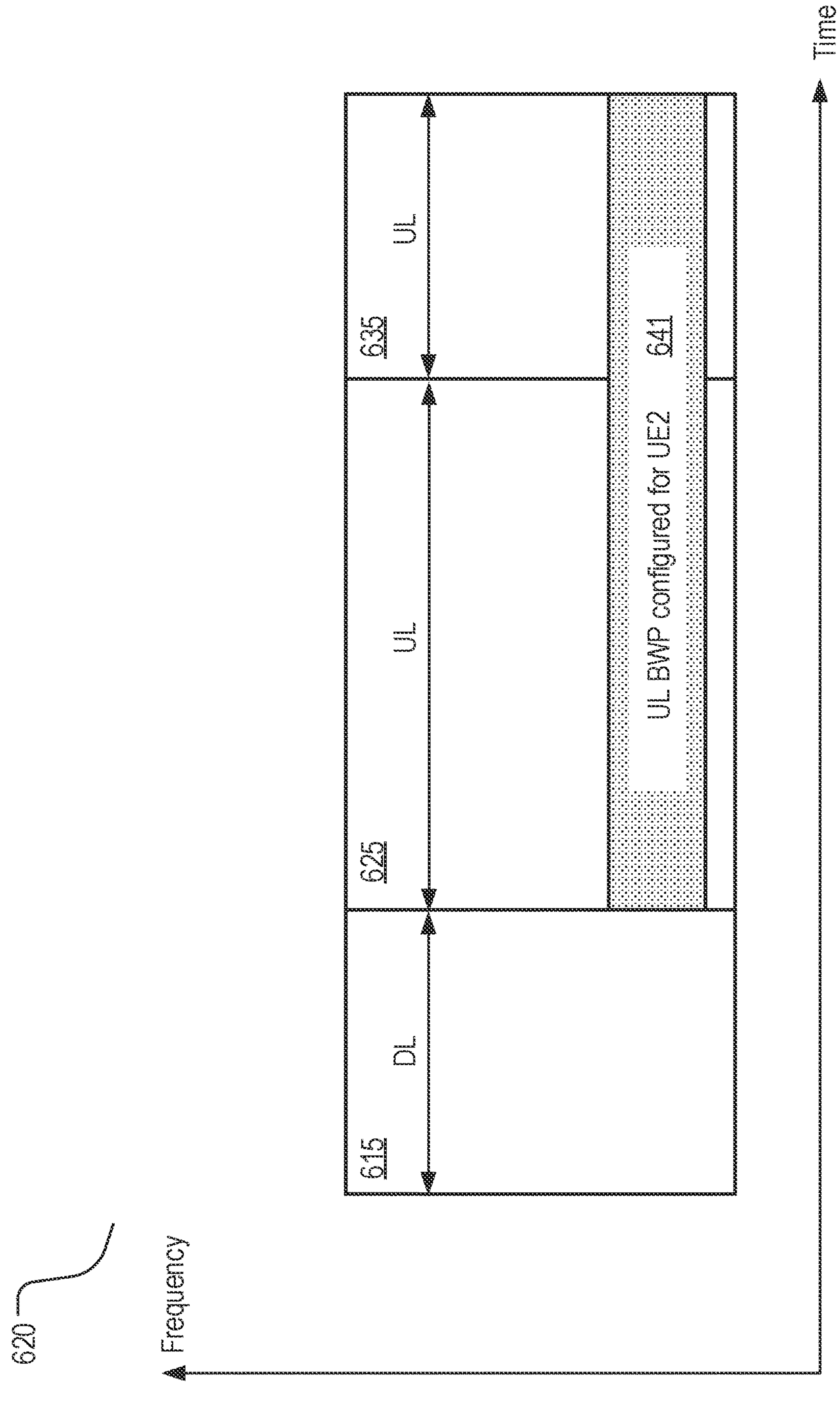
FIG. 6C shows a schematic diagram of another exemplary embodiment for wireless communication.

In some implementations, new signaling (such as RRC signaling or MAC CE signaling or DCI signaling) may be introduced to configure a slot structure for a new UE in the cell or carrier. The new UE performs transmission or reception according to the slot structure configured by the new signaling, except for some special processing. The new UE (e.g., a second new UE, UE2) is configured with a slot structure 600 as shown in FIG. 6A based on common signaling, and/or the new UE2 is configured with a slot structure 620 as shown in FIG. 6C based on new signaling. In this way, the new UE2 obtains the slot structure 600 of the common signaling configuration and the slot structure 620 of the new signaling configuration. The new UE2 may perform data transmission and reception in the slot structure configured by the new signaling, except for the following possible cases, for the reception of cell common signals/channels (e.g., SSB, CORESET #0, etc.) from UL symbols.

In some implementations, when the new signaling configures the slot structure, the downlink symbols in the slots configured by the common signaling are modified to the uplink symbols, and the uplink symbols in the slots configured by the common signaling may remain unchanged (or, may not be overturned). In some other implementations, for the new UE2, the DL symbols in the slot configured by the common signaling may be changed/subverted from the slot structure configured by the new signaling. In this way, for the DL symbols in the slots configured by common signaling, for example, the DL symbols may be configured with UL symbols in the new slot structure, it may be configured to transmit common downlink signals/channels, such as SSB, CORESET #0, etc. The new UE2 may receive SSB and/or CORESET #0 (e.g., some common downlink signal/channel) from being modified into UL symbols.

Optionally in some implementations, the new UE2 may be configured with a UL BWP 641 based on the UL symbols in the slot structure configured by the new signaling. In this case, the data transmission of the new UE2 may be transmitted based on the UL BWP.

Optionally in some implementations, the new UE2 may receive the common downlink signal/channel in the DL symbol configured by the common signaling. In some implementations, common downlink signals/channels may only be received in DL symbols configured according to common signaling.

Optionally in some implementations, the new UE2 may receive common downlink signals/channels from the UL symbols, such as SSB, CORESET #0, etc., wherein the base station and the UE may agree that the common downlink signals/channels are allowed to be transmitted in the UL symbols, and the new UE2 may be allowed to receive common downlink signals/channels in this UL symbol. Optionally in some implementations, the base station and the UE may agree that the SSB may be allowed to be transmitted in the UL symbol (but not CORESET #0), and the new UE2 may be allowed to receive the SSB in the UL symbol.

Optionally in some implementations, for the new UE2, based on the UL symbols in the slot structure configured by the new signaling, a UL BWP may can be configured for uplink data transmission. The dynamically scheduled data or semi-static transmission may be transmitted in the UL BWP. In this case, the resources of the UL BWP in the frequency domain may be configured to avoid overlapping (including partial overlap) with the resources of the common signals/channels of the cell in the frequency domain. Optionally in some implementations, the frequency resource of the UL BWP may not include the frequency resource of the common signal/channel of the cell, for example, direct frequency division between UL BWP and cell common signal/channel. Alternatively in some implementations, in the UL BWP, the resource on which the UE is scheduled to transmit data does not overlap with the cell common signal/channel in the time domain.

In various embodiments, for the method 400 or 450, the first symbol attribute is uplink; the second symbol attribute is downlink; and/or the BWP comprises a downlink BWP configured for the UE.

In some implementations, in response to a second set of symbols in the set of OFDM symbols being configured to transmit a common uplink channel; the downlink BWP comprises the set of OFDM symbols except the second set of symbols.

In some implementations, in response to a second set of symbols in the set of OFDM symbols being configured to transmit a common uplink channel; the downlink BWP comprises the second set of symbols and is configured to be non-overlapping with the common uplink channel in a frequency domain.

In some implementations, the common uplink signaling comprises at least one of the following: a physical random access channel (PRACH), common physical uplink control channel (PUCCH) resource of a cell, an uplink (UL) initial BWP, a reference signal, a demodulation reference signal (DMRS), and/or a sounding reference signal (SRS).

In some implementations, in response to a second set of symbols in the set of OFDM symbols being configured as a part of an uplink initial BWP and the uplink initial BWP overlapping with the downlink BWP in a frequency domain; the downlink BWP comprises the set of OFDM symbols except the second set of symbols, and/or the second set of symbols is treated as uplink symbols.

In some implementations, the first slot structure and corresponding symbol attribute are used to determine the configuration and transmission of at least one of the following: a common downlink channel or a common uplink channel.

Figure 7A:
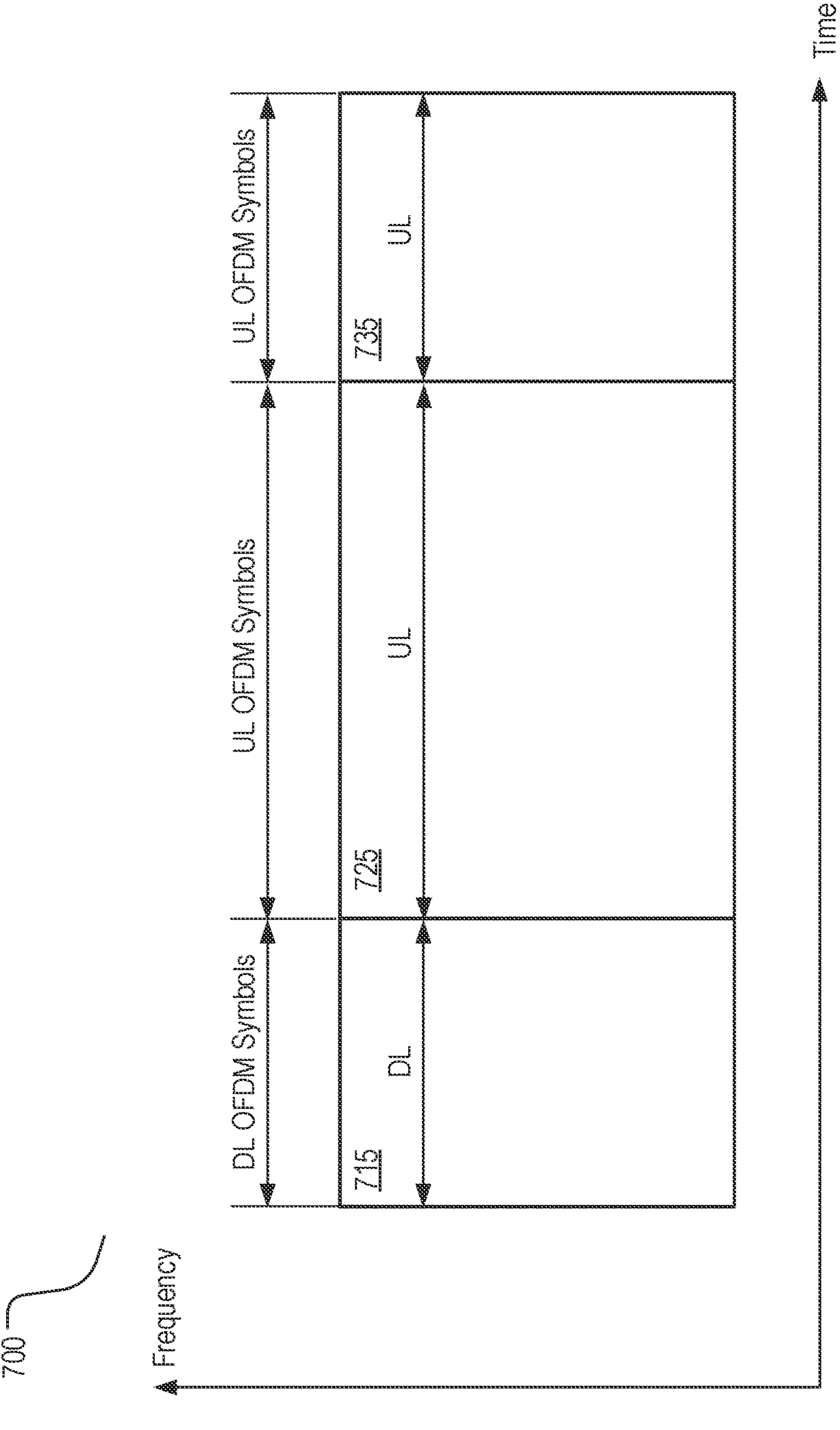
FIG. 7A shows a schematic diagram of an exemplary embodiment for wireless communication.

In various embodiments, referring to FIG. 7A, a middle of a slot 725 may be UL OFDM symbols rather than flexible symbols, a left portion of the slot 715 may be DL OFDM symbols, and a right portion of the slot 735 may be UL OFDM symbols.

In some implementations, there may be both old UEs and new UEs in a cell or carrier. The base station configures the slot structure for all UEs through signaling (e.g., common signaling). This is a common signaling, so that all UEs get the same slot structure. In some implementations, a slot configuration 700 is shown in FIG. 7A, such as configuring the symbol attributes (such as DL and/or UL) within the slot.

Figure 7B:
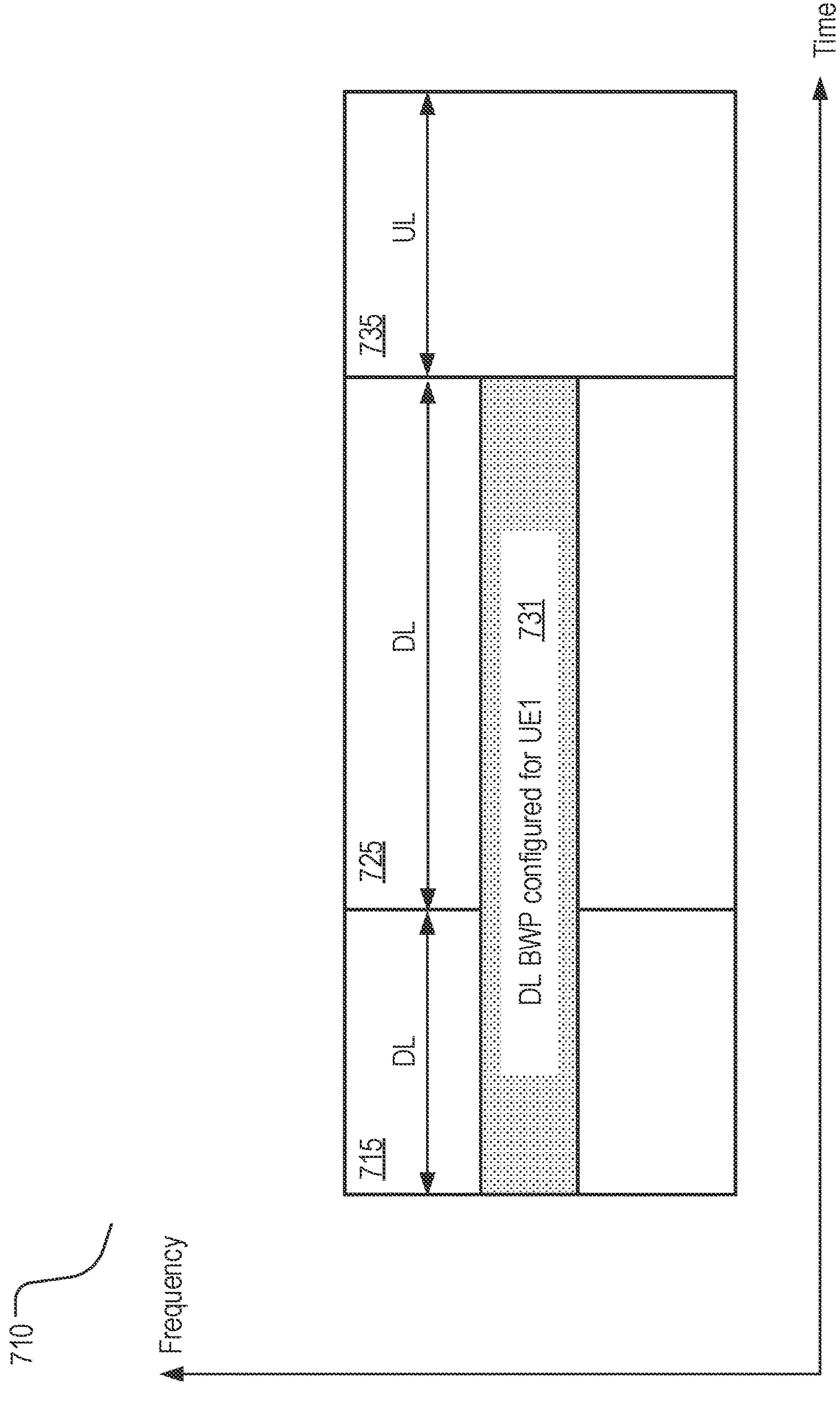
FIG. 7B shows a schematic diagram of another exemplary embodiment for wireless communication.

In some implementations, new signaling (such as RRC signaling or MAC CE signaling or DCI signaling) may be introduced to configure a slot structure for a new UE in the cell or carrier. The new UE performs transmission or reception according to the slot structure configured by the new signaling, except for some special processing. The new UE (e.g., a first new UE, UE1) may be configured with a slot structure 700 as shown in FIG. 7A based on common signaling, and then the new UE1 may be configured with a slot structure 710 as shown in FIG. 7B based on new signaling. In this way, the new UE1 may obtain the slot structure 700 of the common signaling configuration and the slot structure 710 of the new signaling configuration. The new UE1 may perform data transmission and reception in the slot structure configured by the new signaling, except for the following possible cases, for the transmission of cell common signals/channels (e.g., PRACH, common PUCCH of the cell, etc.) from DL symbols.

In some implementations, when the new signaling configures the slot structure, the uplink symbols in the slots configured by the common signaling may be modified to the downlink symbols, and the downlink symbols in the slots configured by the common signaling may remain unchanged (or may not be overturned).

In some implementations, for the new UE1, the UL symbols in the slot configured by the common signaling are changed/subverted from the slot structure configured by the new signaling. In this way, for the UL symbols in the slots configured by common signaling, e.g., the UL symbols may be configured with DL symbols in the new slot structure, it may be configured to transmit common uplink signals/channels, such as PRACH, common PUCCH of the cell, etc. The new UE1 may transmit PRACH and/or common PUCCH of the cell, for example, some common uplink signal/channel, from being modified into DL symbols.

Optionally in some implementations, the new UE1 may be configured with a DL BWP 731 based on the DL symbols in the slot structure configured by the new signaling. In this case, at least the data reception of the new UE1 at the UE level may be based on the DL BWP.

Optionally in some implementations, the new UE1 may transmit the common uplink signal/channel of the cell in the UL symbol configured in the common signaling. The common uplink signal/channel may only be transmitted in the UL symbols configured according to the common signaling.

Optionally in some implementations, regarding the new UE1 transmitting common uplink signals/channels from the DL symbols, such as PRACH, common PUCCH of the cell, etc., wherein the base station and the UE may agree that the common uplink signals/channels are allowed to be transmitted in the DL symbols, and the base station may be allowed to receive common uplink signals/channels in this DL symbol. The base station and the UE may agree that the PRACH is allowed to be transmitted in the DL symbol (but not common PUCCH), and the base station is allowed to receive the PRACH in the DL symbol.

Optionally in some implementations, for the new UE1, based on the DL symbols in the slot structure configured by the new signaling, a DL BWP 731 may be configured for downlink data transmission. The dynamically scheduled data or semi-static transmission may be transmitted in the DL BWP. The resources of the DL BWP in the frequency domain may be configured to avoid overlapping (including partial overlap) with the resources of the common downlink signals/channels of the cell in the frequency domain. Preferably, the frequency resource of the DL BWP may not include the frequency resource of the common signal/channel of the cell, for example, direct frequency division between DL BWP and cell common signal/channel. Alternatively in some implementations, in the DL BWP, the resource on which the UE is scheduled to receive data does not overlap with the cell common signal/channel in the time domain.

Figure 7C:
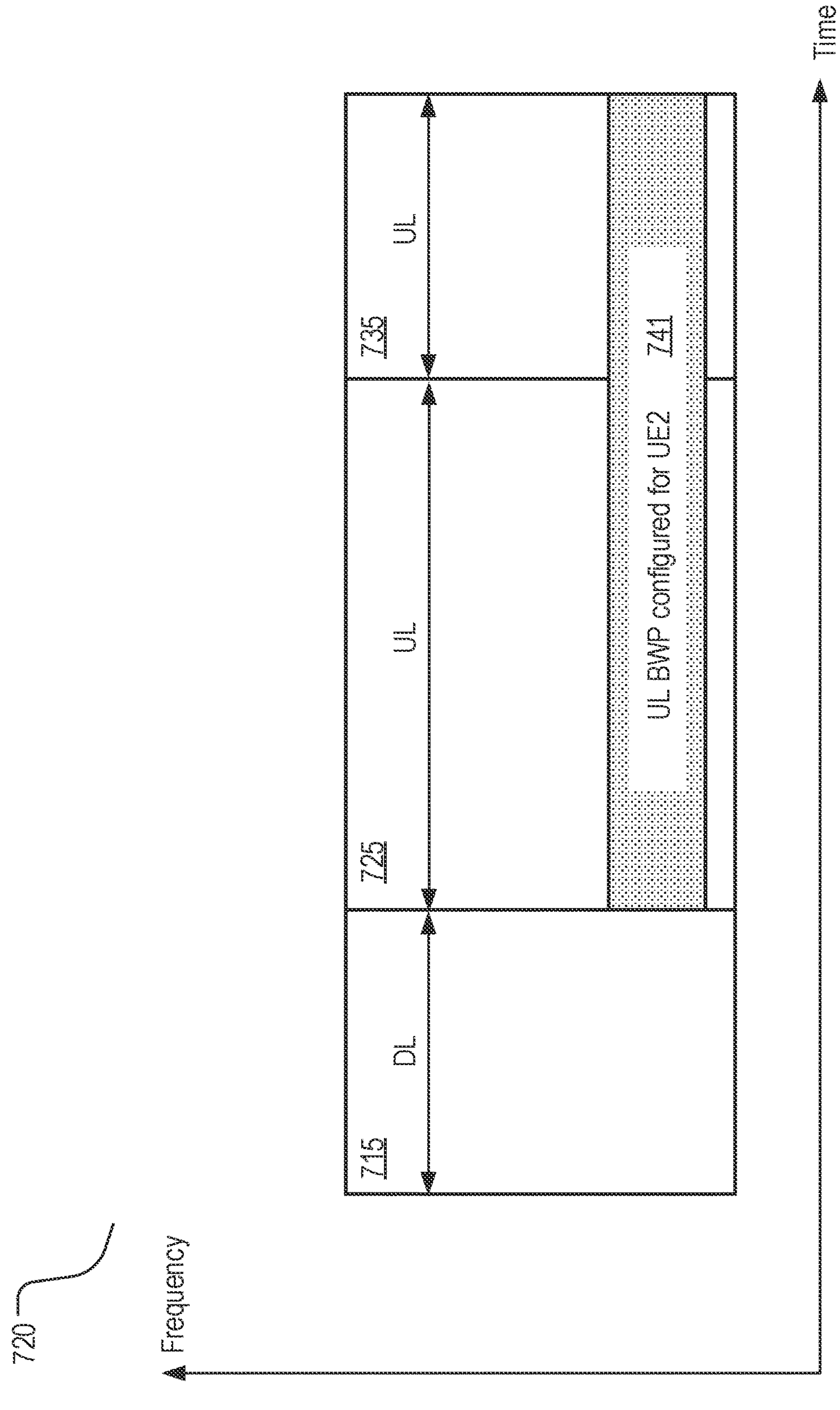
FIG. 7C shows a schematic diagram of another exemplary embodiment for wireless communication.

In some implementations, referring to FIG. 7C, the configured slot structure 720 is the same as the slot structure 700 in FIG. 7A for a new UE (e.g., a second new UE, UE2), and the new UE2 does not need to consider a new processing method. Optionally in some implementations, the new UE2 may be configured with a UL BWP 741 based on the UL symbols in the slot structure. The data transmission of the new UE2 may be transmitted based on the UL BWP.

In various embodiments, the common uplink channel/signal may be configured and transmitted based on the OFDM symbol attribute based on the configured first slot structure. For example, in a slot, some symbols may be configured as uplink attribute or flexible attribute based on the configured first slot structure, but these symbols are changed to downlink attribute based on the configured second slot structure. When a common uplink channel/signal is determined to be transmitted in these symbols in the slot based on the configured common uplink channel/signal period and OFDM symbol position, the UE may transmit the common uplink channel/signal in these symbols, although these symbols are changed to downlink attribute based on the configured second slot structure.

Similarly, in some implementations, the common downlink channel/signal may be configured and transmitted based on the OFDM symbol attribute based on the configured first slot structure. For example, in a slot, some symbols may be configured as downlink attribute or flexible attribute based on the configured first slot structure, but these symbols are changed to uplink attribute based on the configured second slot structure. When a common downlink channel/signal is determined to be transmitted in these symbols in the slot based on the configured common downlink channel/signal period and OFDM symbol position, the UE may transmit the common downlink channel/signal in these symbols, although these symbols are changed to uplink attribute based on the configured second slot structure.

In various embodiments referring to FIGS. 5A-7C, all UEs may be in the same cell. The new UEs may be configured with different slot structures, for example, the properties of the same OFDM symbol within the slot are different from the perspective of different UEs. For all UEs, a common channel or signal of a cell may be transmitted and received based on a slot structure configured by common signaling. The reception and transmission of UE-level data are based on the slot structure configured by UE-specific signaling. An UL BWP (or a DL BWP) may be configured based on a slot structure configured by UE-specific signaling. The symbols used by the UL BWP (or the DL BWP) may be determined based on the symbol attributes corresponding to the slot structure configured by the UE-specific signaling. The optimal configured UL BWP may not overlap the common downlink signal/channel of the cell in the frequency domain. The optimal configured DL BWP may not overlap the common uplink signal/channel of the cell in the frequency domain. When the configured UL BWP and the common downlink signal/channel of the cell overlap in the frequency domain, the symbol used by the UL BWP skips the symbol of the common downlink signal/channel of the cell. If the configured DL BWP overlaps the common uplink signal/channel of the cell in the frequency domain, the symbol used by the DL BWP skips the symbol of the common uplink signal/channel of the cell.

In some implementations, when both the configured UL BWP and the configured DL BWP contain the same symbols, the UE expects that the UL BWP and the DL BWP do not overlap in the frequency domain.

In some implementations, when both the configured UL BWP and the configured DL BWP contain the same symbol, the UE and the base station agree to use the same symbol for UL transmission or downlink transmission.

In some implementations, when the UL BWP and DL BWP are configured to contain the same symbol, the UE does not expect to perform both UL transmission and DL reception in the same symbol.

In some implementations, the UL or DL initial BWP may be configured based on the slot structure configured by common signaling. The symbols used by the UL or DL initial BWP may be determined based on the symbol attributes corresponding to the slot structure configured by the common signaling.

In some implementations, when the UL initial BWP is configured to overlap the UL BWP in the frequency domain, and when a symbol is a UL symbol in the UL initial BWP, and the symbol is a non-UL symbol in the UL BWP, the UE expects the symbol to be treated as a UL symbol in the overlapping region in the frequency domain.

In some implementations, when the DL initial BWP is configured to overlap the DL BWP in the frequency domain, and when a symbol is a DL symbol in the DL initial BWP, and the symbol is a non-DL symbol in the DL BWP, the UE expects the symbol to be treated as a DL symbol in the overlapping region in the in the frequency domain.

In some implementations, the common uplink signals/channels of the cell may include but are not limited to the following channels/channels: PRACH, common PUCCH resources of the cell, UL initial BWP, reference signals (e.g., DMRS and/or SRS).

In some implementations, the common downlink signals/channels of the cell may include but are not limited to: SSB, CORESET #0, DL initial BWP, and CORESET for other common channels, various types of system information blocks, reference signals (e.g., DMRS, various purposes CSI-RS, positioning reference signal, synchronization tracking reference signal, etc.).

The present disclosure describes methods, apparatus, and computer-readable medium for wireless communication. The present disclosure addressed the issues with configuring time-frequency resource in a half-duplex and/or full-duplex telecommunication system. The methods, devices, and computer-readable medium described in the present disclosure may facilitate the performance of wireless communication by configuring time-frequency resource in a half-duplex and/or full-duplex telecommunication system, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:

receiving, by a user equipment (UE), first signaling to configure a first symbol attribute for a set of orthogonal frequency division multiplexing (OFDM) symbols, the first symbol attribute includes either an uplink attribute or a downlink attribute;

receiving, by the UE, second signaling to configure a second symbol attribute for the set of OFDM symbols, the second symbol attribute includes either the downlink attribute or the uplink attribute; and determining, by the UE based on the second symbol attribute, a bandwidth part (BWP) comprising at least one symbol in the set of OFDM symbols, the BWP having an attribute being same as the second symbol attribute and being different as the first symbol attribute.

2. The method according to claim 1, wherein:

the first signaling comprises common signaling for at least one UE in a cell; and the second signaling comprises UE-specific signaling for the UE.

3. The method according to claim 1, wherein:

the first symbol attribute is downlink;

the second symbol attribute is uplink; and the BWP comprises an uplink BWP configured for the UE.

4. The method according to claim 3, wherein:

in response to a second set of symbols in the set of OFDM symbols being configured to transmit a common downlink channel:

the uplink BWP comprises the set of OFDM symbols except the second set of symbols.

5. The method according to claim 1, wherein:

the first symbol attribute is uplink;

the second symbol attribute is downlink; and the BWP comprises a downlink BWP configured for the UE.

6. The method according to claim 3, wherein:

in response to a second set of symbols in the set of OFDM symbols being configured to transmit a common downlink channel:

the uplink BWP comprises the second set of symbols and is configured to be non-overlapping with the common uplink channel in a frequency domain.

7. The method according to claim 3, wherein:

in response to a second set of symbols in the set of OFDM symbols being configured as a part of a downlink initial BWP and the downlink initial BWP overlapping with the uplink BWP in a frequency domain:

the uplink BWP comprises the set of OFDM symbols except the second set of symbols, and the second set of symbols is treated as downlink symbols.

8. A method for wireless communication, comprising:

sending, by a base station, first signaling to configure a first symbol attribute for a set of orthogonal frequency division multiplexing (OFDM) symbols, the first symbol attribute includes either an uplink attribute or a downlink attribute;

sending, by the base station, second signaling to configure a second symbol attribute for the set of OFDM symbols, the second symbol attribute includes either the downlink attribute or the uplink attribute; and configuring, by the base station based on the second symbol attribute, a bandwidth part (BWP) comprising at least one symbol in the set of OFDM symbols, the BWP having an attribute being same as the second symbol attribute and being different as the first symbol attribute.

9. The method according to claim 8, wherein:

the first signaling comprises common signaling for at least one UE in a cell; and the second signaling comprises UE-specific signaling for the UE.

10. The method according to claim 8, wherein:

the first symbol attribute is downlink;

the second symbol attribute is uplink; and the BWP comprises an uplink BWP configured for the UE.

11. The method according to claim 10, wherein:

in response to a second set of symbols in the set of OFDM symbols being configured to transmit a common downlink channel:

the uplink BWP comprises the set of OFDM symbols except the second set of symbols.

12. The method according to claim 10, wherein:

in response to a second set of symbols in the set of OFDM symbols being configured to transmit a common downlink channel:

the uplink BWP comprises the second set of symbols and is configured to be non-overlapping with the common uplink channel in a frequency domain.

13. The method according to claim 10, wherein:

in response to a second set of symbols in the set of OFDM symbols being configured as a part of a downlink initial BWP and the downlink initial BWP overlapping with the uplink BWP in a frequency domain:

the uplink BWP comprises the set of OFDM symbols except the second set of symbols, and the second set of symbols is treated as downlink symbols.

14. The method according to claim 8, wherein:

the first symbol attribute is uplink;

the second symbol attribute is downlink; and the BWP comprises a downlink BWP configured for the UE.

15. A wireless terminal device comprising:

a memory storing instructions; and a processor in communication with the memory, wherein, when the processor executes the instructions, the processor is configured to cause the wireless terminal device to perform:

receiving first signaling to configure a first symbol attribute for a set of orthogonal frequency division multiplexing (OFDM) symbols, the first symbol attribute includes either an uplink attribute or a downlink attribute;

receiving second signaling to configure a second symbol attribute for the set of OFDM symbols, as a second symbol attribute the second symbol attribute includes either the downlink attribute or the uplink attribute; and determining, based on the second symbol attribute, a bandwidth part (BWP) comprising at least one symbol in the set of OFDM symbols, the BWP having an attribute being same as the second symbol attribute and being different as the first symbol attribute.

16. The wireless terminal device according to claim 15, wherein:

the first signaling comprises common signaling for at least one wireless terminal device in a cell; and the second signaling comprises UE-specific signaling for the wireless terminal device.

17. A wireless node comprising:

a memory storing instructions; and a processor in communication with the memory, wherein, when the processor executes the instructions, the processor is configured to cause the wireless node to perform:

sending first signaling to configure a first symbol attribute for a set of orthogonal frequency division multiplexing (OFDM) symbols, the first symbol attribute includes either an uplink attribute or a downlink attribute;

sending second signaling to configure a second symbol attribute for the set of OFDM symbols, the second symbol attribute includes either the downlink attribute or the uplink attribute; and configuring, based on the second symbol attribute, a bandwidth part (BWP) comprising at least one symbol in the set of OFDM symbols, the BWP having an attribute being same as the second symbol attribute and being different as the first symbol attribute.

* * * * *